United States Patent [19]

Koorneef

[11] 4,374,452

[45] Feb. 22, 1983

[54] APPARATUS FOR MANUFACTURING A COLOR DISPLAY TUBE

[75] Inventor: Jacob Koorneef, Eindhoven, Netherlands

[73] Assignee: U.S. Philips Corporation, New York, N.Y.

[21] Appl. No.: 142,938

[22] Filed: Apr. 23, 1980

Related U.S. Application Data

[60] Division of Ser. No. 35,951, May 4, 1979, Pat. No. 4,222,159, which is a continuation of Ser. No. 893,939, Apr. 16, 1978, abandoned, which is a continuation of Ser. No. 759,112, Jan. 13, 1977, abandoned.

[30] Foreign Application Priority Data

Jan. 16, 1976 [NL] Netherlands .......................... 7600418

[51] Int. Cl.³ ............................ H01J 9/00; B32B 3/24

[52] U.S. Cl. ........................................ 445/66; 156/259; 156/519; 156/554; 156/553

[58] Field of Search ............... 29/25.19; 156/252, 259, 156/272, 554, 559, 324, 517, 519, 553; 313/402, 403

[56] References Cited

U.S. PATENT DOCUMENTS

| | | | |
|---|---|---|---|
| 3,609,858 | 10/1971 | Shaw et al. | 156/259 X |
| 3,712,849 | 1/1973 | Robbiati | 156/324 X |
| 3,985,604 | 10/1976 | Balla | 156/272 X |
| 4,070,214 | 1/1978 | Brown et al. | 156/324 X |
| 4,222,159 | 9/1980 | Koorneef | 29/25.14 |
| 4,223,074 | 9/1980 | Yoshida et al. | 156/272 X |

*Primary Examiner*—Kenneth J. Ramsey
*Attorney, Agent, or Firm*—Joseph P. Abate

[57] ABSTRACT

An apparatus for fabricating a quadrupole shadow mask includes a reel for storing a web of insulating material having a conductive layer on one side thereof, a reel for storing a long metal strip having a plurality of spaced apertures arranged in parallel rows, means for cutting the web into strips and a roller having circumferential grooves for positioning and then pressing the insulating strips onto the surface of the metal strip between the rows. The resulting strip is guided through a heating device and then is cut into sheets of predetermined length.

8 Claims, 14 Drawing Figures

APPARATUS FOR MANUFACTURING A COLOR DISPLAY TUBE

This application is a Division of Ser. No. 35,951, filed May 4, 1979, now U.S. Pat. No. 4,222,159, which is a continuation of Ser. No. 893,939, filed Apr. 16, 1978, which in turn is a continuation of Ser. No. 759,112, filed Jan. 13, 1977, both now abandoned.

BACKGROUND OF THE INVENTION

The invention relates to a method of manufacturing a color display tube comprising, in an evacuated envelope, means to generate a number of electron beams, a display screen having a large number of regions luminescing in different colors, and color selection means having a large number of apertures which associate each electron beam with luminescent regions of one color, and electrodes for forming an electron lens in each aperture.

The invention also relates to a color display tube manufactured according to the method and to a device for carrying out the method.

Such a color display tube of the post-deflection focusing type is disclosed in U.S. Pat. No. 3,398,309. The object of post-focusing is to increase the brightness of the displayed picture by increasing the transmission of the color selection means. In tubes without post-focusing, a very large part, for example 80 to 85%, of the electrons in the beams is intercepted by the shadow mask. By using post-focusing, the apertures in the color selection means can be enlarged, since the beams are focused as they pass through the apertures. As a result, the electron spots on the screen are considerably smaller than the apertures so that in spite of the increased aperture size there is sufficient landing tolerance.

The electron lens which is formed in the apertures of the shadow mask of known tubes is of the unipotential type so that a rather large voltage difference is required between the electrodes which form the lens.

Another post-focusing tube is described in U.S. Pat. No. 2,728,024. In this tube, the electron beams pass successively through two grids each consisting of parallel conductors. The conductors associated with different grids are at right angles to each other. With such an arrangement the electron beams are focused successively by two electron-optical cylinder lenses which are rotated 90° relative to each other. By the action of both lenses together, the electron beams are focused in one direction and defocused in a direction at right angles thereto.

A drawback of this known tube is that it also requires a rather large voltage difference for focusing. In addition, the two grids do not form a mechanical unit so that vibration of the grid wires presents great problems. Furthermore this lens arrangement requires a flat screen.

SUMMARY OF THE INVENTION

It is an object of the invention to provide a method of manufacturing color display tubes of the kind mentioned in the preamble which is inexpensive, can be carried out on a large scale and is easy to mechanize.

Another object of the invention is to provide a method of manufacturing a color display tube of the kind mentioned in the preamble which does not require a large voltage difference for focusing the beam.

Still another object of the invention is to provide an apparatus for carrying out this method.

In the method according to the invention, the color selection means or shadow mask is manufactured by securing supports of insulating material to an apertured metal plate. The supports are provided with elongate conductors at least on the side thereof remote from the plate. The plate constitutes a first set of lens electrodes and the metal conductors constitute a second set of lens electrodes.

The great advantage of the method according to the invention is that it results in very little loss of material. In addition, the method is very suitable for mass production.

The metal plate determines the geometric shape of the color selections means. A system of elongate electric conductors is provided thereon which are separated from the plate by the insulating supports. The supports may be in the form of strips and be provided between the whole elongate conductor and the metal plate, or support the conductor in a number of places in that a number of areas projecting in the direction of the metal plate are provided on the conductor and form the supports. In this manner, a quadrupole lens is formed in each aperture of the color selection means upon application of a voltage difference between the conductors and the plate. Because the electric field is normal to or substantially normal to the electron path, quadrupole lenses are much stronger than cylinder lenses so that much lower voltages will suffice. The fact that a quadrupole lens focuses in one direction and defocuses in a direction at right angles thereto does not adversely affect the operation of the tube when all quadrupoles have the same orientation and, in addition the luminescent regions of the display screen preferably have the shape of substantially parallel strips whose longitudinal direction is substantially parallel to the defocusing direction of the quadrupole lenses.

It is possible to secure the supports with the conductors to the metal plate or to stretch them against the metal plate by means of at least one resilient element at the ends. When the supports are secured to a connection strip with their ends, one resilient element is enough. It is also possible to secure each support by means of a resilient element secured to its end, so that the support is stretched against the metal plate.

The metal plate may be provided with long apertures so that a frame of lines is formed and the supports are provided substantially at right angles to the frame of lines. It is also necessary for the supports to be provided, on the side facing the plate, with conductors in order to prevent charging by the electron beam. As a matter of fact, without the latter conductors, the electron beam would "see" the insulating material.

It is also possible for the plate to be provided with a large number or multiplicity of apertures arranged in a plurality of parallel rows and columns and for the supports with conductors to be provided between the rows of apertures.

The supports may consist of glass and be provided against the plate in the soft condition. Glass supports adhere to the metal plate. However, they are also sufficiently flexible to be provided in a frame together with the elongate conductors and to be stretched against the plate by at least one resilient element in the manner previously described.

Supports of a synthetic material, preferably polyimide (for example, the polyimide of 4-4′ diaminodiphenyl ether and 1-2-4-5 benzenetetracarbonic acid anhydride, known as Kapton) have proven to be particularly suitable. Elongate metal conductors in the form of a metal wire or metal film, preferably consisting of aluminium, are provided on these supports at least on the side remote from the metal plate. However, it is also possible to use gold and other suitable metals.

Another suitable embodiment of the invention is one in which the supports provided with conductors are obtained by anodizing aluminium on one side. This may be done by anodizing aluminium strips on one side (the side afterwards facing the plate) or by dividing an aluminium plate anodized on one side into strips (for example, by cutting it with an electron beam or a laser beam).

The elongate conductors preferably have the form of a metal film having a thickness which is smaller than 2 μm. Metal chips which may be formed during the manufacture of the strips will then be so thin that they will be evaporated by the passage of relatively low current when the chip short-circuits the two sets of lens electrodes. In this manner, any short-circuit between the two sets of lens electrodes is automatically removed.

A suitable apparatus for carrying out the method device comprises a reel for storing a roll of insulating material covered at least on one side with a conductor, a reel for storing a roll of plate material provided with apertures, a cutting device for forming the supports by cutting the web of insulating material into strips, a roller-like pressure member for pressing the supports and the plate material together in the desired places, and a heating device for heating the supports and the plate material. The heating device may include, for example, one or more heating lamps or elements. Heating may also be carried out by means of a high-frequency electromagnetic field. The pressure member for pressing together the supports and the plate material preferably includes a grooved roller with grooves which guide the supports so that they are pressed against the plate material in the correct positions. By combination of the heating device and the pressure member, and with a suitable choice for the material of the roller-like pressure member, the distance between two supports comprising a metal film can be varied and adapted to, for example, small variations in the pitch of the apertures in the plate material by a variation in the temperature difference between the pressure member and the plate material as a result of which the pressure member expands or shrinks. It has been found that a roller-like pressure member of aluminium which is provided with a heating device gives very good results in the case of steel plate material.

The invention is particularly suitable for mass production of the color-selection mask described above.

BRIEF DESCRIPTION OF THE DRAWING

Embodiments of the invention will now be described by way of example with reference to the drawing figures, in which.

DESCRIPTION OF THE PREFERRED EMBODIMENTS

Figure 1:
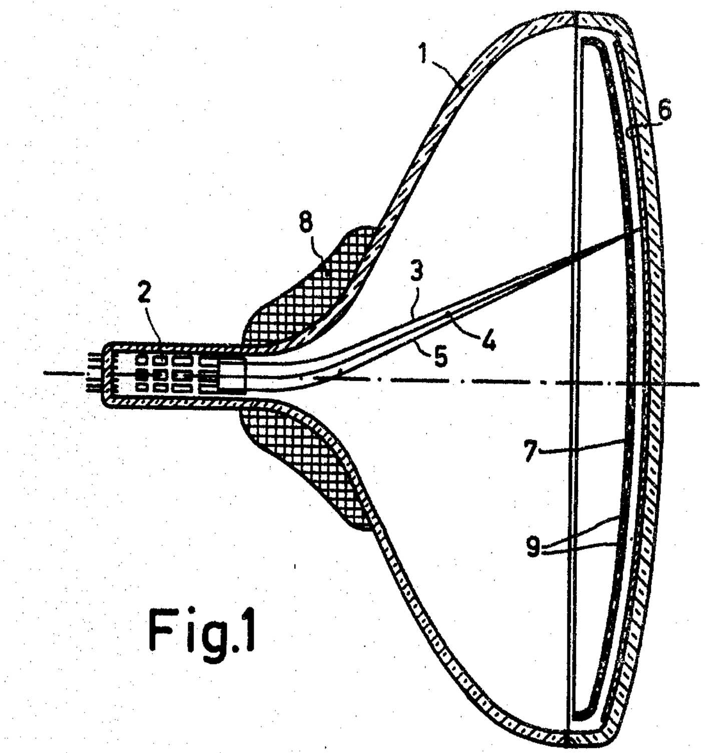
FIG. 1 is a sectional view of a cathode ray tube manufactured by the method according to the invention

The tube shown in FIG. 1 comprises a glass envelope 1, means 2 to generate three electron beams 3, 4 and 5, a display screen 6, color selection means 7 and deflection coils 8. The electron beams 3, 4 and 5 are generated in one plane, the plane of the drawing of FIG. 1, and are deflected over the display screen 6 by means of the deflection coils 8. The display screen 6 consists of a large number of phosphor strips luminescing in red, green and blue whose longitudinal direction is at right angles to the plane of the drawing of FIG. 1. During normal opeeration of the tube, the phosphor strips are vertical and FIG. 1, hence, is a sectional view at right angles to the phosphor strips. The color selection means 7 has a large number of apertures 9 which are shown diagrammatically in FIG. 1. The three electron beams 3, 4 and 5 pass through the apertures 9 at a small angle with each other and therefore each impinges only upon phosphor strips of one color. The apertures 9 in the color selection means 7 are thus very accurately positioned relative to the phosphor strips of the display screen 6.

In most shadow mask tubes generally used at the present time, the electron beams 3, 4 and 5 are not focused upon passing through the apertures 9. In U.S. Pat. No. 3,398,309, mentioned above, unipotential lenses for focusing the electron beams are formed in the apertures 9. It has also been suggested to postfocus the beams by means of a potential difference between the color selection means 7 and the display screen 6. In such an arrangement however, secondary electrons have a very annoying effect.

Figure 2:
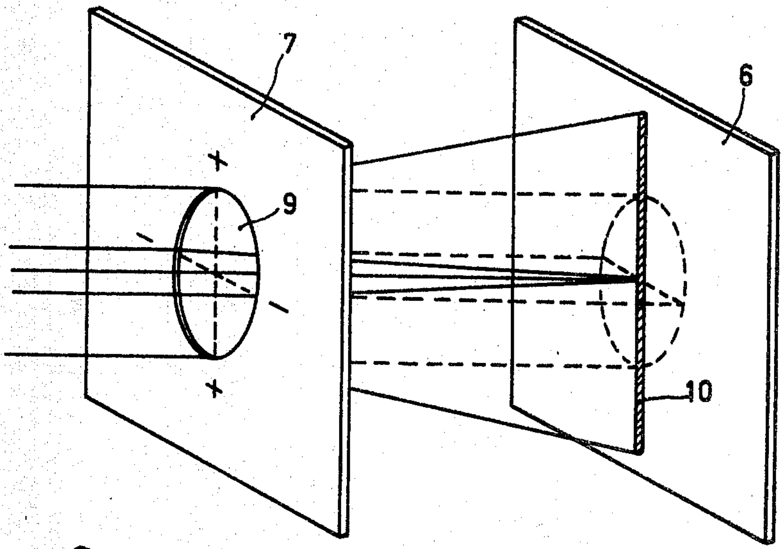
FIG. 2 is a diagrammatic view illustrating the operation of a quadrupole lens

In color display tubes manufactured by means of the method according to the invention, a quadrupole lens is formed in each aperture 9 of the color selection means 7. FIG. 2 illustrates a part of the color selection means 7 and one of the apertures 9. As shown in FIG 2, the potential variation along the edge of the aperture 9 is alternately −, +, − so that a quadrupole field is formed in the aperture. The electron beam passing through the aperture 9 is defocused in the vertical plane so that an electron spat 10 is formed when the display screen is exactly at the horizontal focus. It is, however, preferable not to focus the beam exactly on the display screen 6 so that a slightly wider electron spot is obtained. However, the spot should be sufficiently narrow to prevent landing errors.

The fact that the electron beam passes through the aperture 9 at a small angle has only a minor effect on the focusing so that the color selection of the three electron beams 3, 4 and 5 is effected in a manner quite analogous to that in known shadow mask tubes. As a result of the strong focusing, however, the aperture 9 may be made much larger than in known shadow mask tubes, so that of far more of electrons impinge upon the display screen 6 and a brighter picture is obtained. The defocusing in the vertical direction need not be objectionable when phosphor strips are used which are parallel to the longitudinal direction of the spot 10.

Figure 3:
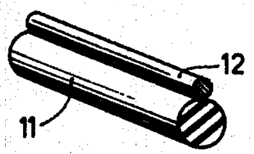
FIGS. 3 and 4 show two embodiments of elongate supports with conductors FIGS. 5*a, b, c* and *d,* and FIG. 6 further illustrate a method embodying to the invention FIGS. 7*a,* 7*b* and 7*c* show the connection of the supports by means of a resilient element
Figure 4:
Figures 8, 9:
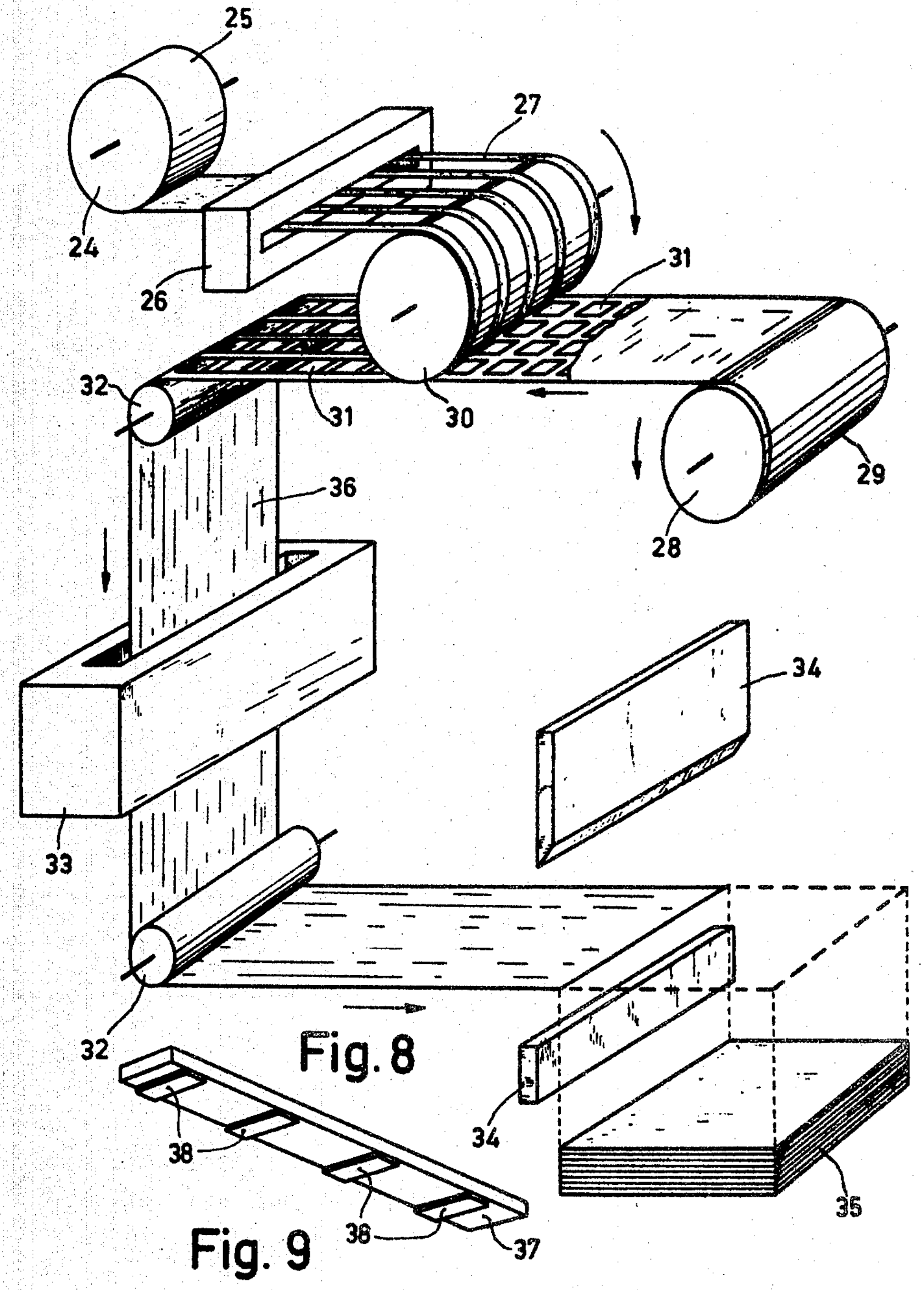
FIG. 8 shows an apparatus for carrying out a method according to the invention.
FIG. 9 shows another embodiment of FIGS. 3 and 4.

According to the invention, the color selection means 7 is made by securing supports of insulation material to an apertured metal plate. The supports are provided with elongate conductors at least on the side remote from the plate. The apertured plate forms a first set of lens electrodes and the conductors on the supports constitute a second set of lens electrodes. FIGS. 3, 4 and 9 show three possible shapes for the supports. FIG. 3 shows a glass support 11 with an aluminium conductor 12 in the form of a wire. During manufacture while in the support 11, a soft condition, is secured to an apertured metal plate, the conductor being more or less embedded in the glass. FIG. 4 shows another embodiment. The support 11 in this case consists of a strip of insulating material for example polyimide, with a metal film, for example aluminium or gold, which forms a conductor 12. The metal film may, if desired, have the same width as the support, in which case the supports may be cut from a foil which is provided with a metal film.

FIG. 9 shows an embodiment in which, in contrast to the structures shown in FIGS. 3 and 4, the support does not support the entire conductor, but rather supports it in a restricted number of places. For this purpose, the conductor is provided with supports 38 of insulating material. Stresses due to expansion upon heating of the conductor are better compensated for by this support.

Figure 5A:
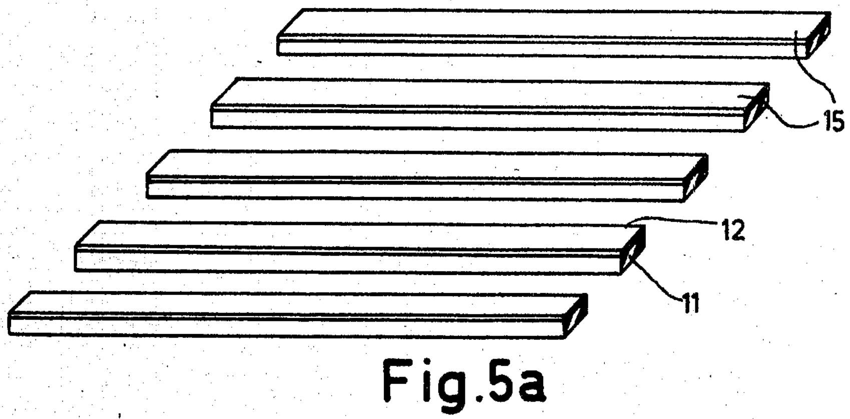
Figure 5B:
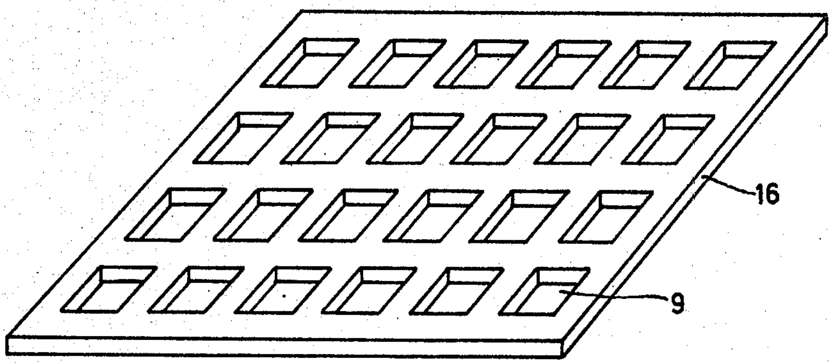
Figure 5C:
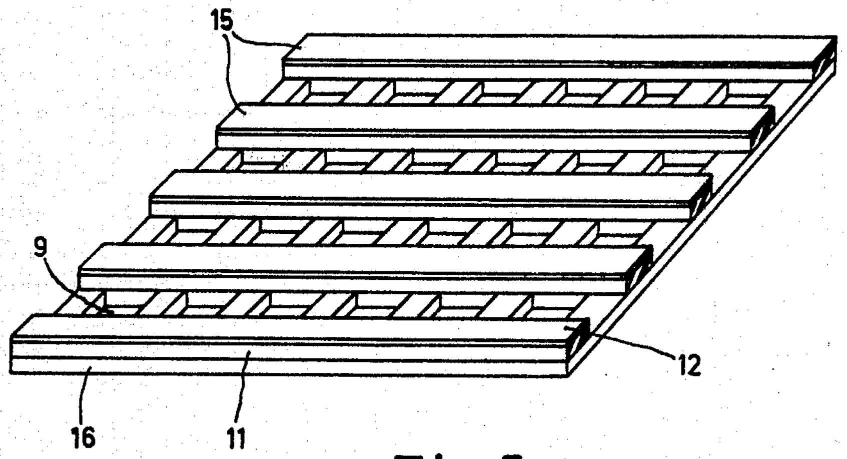
Figure 5D:
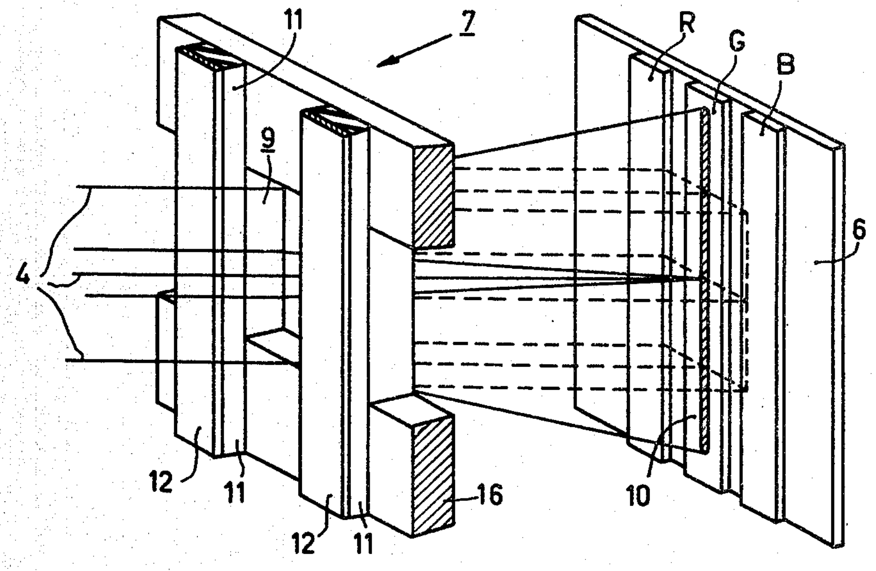

FIG. 5*a* diagrammatically shows portions of a number of substantially parallel electrodes 15 each having a support 11 carrying a conductor 12 in the form of a metal film. The electrodes 15, which in the finished device are connected together, for example at their ends by strips, are secured between the apertures 9 of a metal plate 16 of FIG. 5*b*. In this manner, a system of lens electrodes is obtained such as that shown in FIG. 5*c*. By applying a potential difference between the metal plate 16 and the conductors 12, a quadrupole field is formed in each aperture 9. FIG. 5*d* shows the operation of such a quadrupole lens. The color selection means 7 consists of a set of parallel supports 11, each provided with a metal conductor 12 and secured to a metal plate 16. The metal conductors 12 and the portions of the metal plate 16 around aperture 9 constitute the poles of the quadrupole lens. The display screen 6 is provided with three phosphor strips associated with the aperture 9, which are denoted by R (red), G (green) and B (blue). The FIG. 5*d* shows only a few rays of the central electron beam 4 which form the electron spot 10 on the phosphor strip G. The interconnected conductors 12 are at a lower potential than the potential of the metal plate 16 so that the quadrupole lens shown diagrammatically in FIG. 2 is formed in each aperture 9.

Advantageously the metal plate 16 has a thickness between 100 and 200 μm. The thickness of the supports 11 is preferably between 20 and 150 μm and depends, inter alia, on the kind of insulation material used. As stated above, the metal film preferably has a thickness smaller than 2 μm. The distance between the centers of adjacent apertures in a row is approximately 700 to 800 μm. The portions of the plate 16 between the apertures have a width of approximately 200 μm. The width of the supports is preferably smaller than 180 μm. The plate usually consists of a ferromagnetic material.

Figure 6:
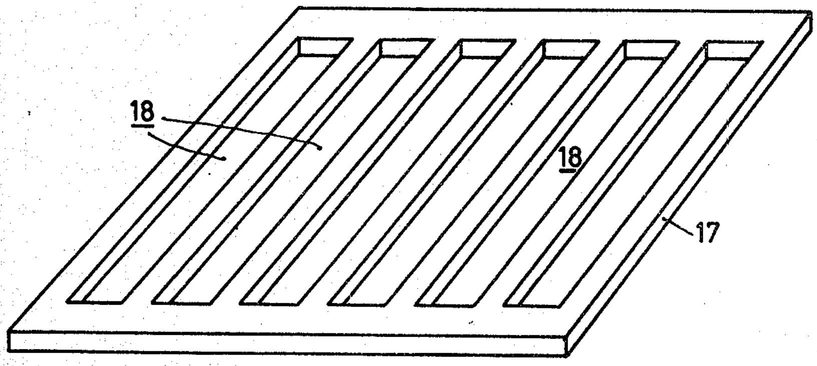

FIG. 6 shows a metal plate 17 having apertures 18. However, these apertures 18 are very long so that the plate 17 has a low rigidity and has to be secured in the wall of the tube envelope or in a frame such as frame 23 shown in FIG. 7*b*. The supports 11 shown in FIG. 5*a* are secured to such a plate in a manner such that their direction is substantially at right angles to the longitudinal direction of the apertures 18 in plate 17. In addition, the supports 11 on the side facing the plate should be provided with a conductor to prevent charging by the electron beams.

In the embodiments shown in FIG. 5 and FIG. 6, the supports 11 may be glued to the plates 16 and 17, respectively. It has been found that several methods can give good results, dependent upon the material used. When the material of the supports is, for example, the polyimide of 4-4′ diaminodiphenyl ether and 1- 2-4-5 benzenetetracarbonic acid dianhydride, then the polyamide of the same materials in a solvent is very suitable to glue the polyimide supports to the plate material. Upon heating, the polyamide is converted into the polyimide and adheres to the plate 16.

Figure 7A:
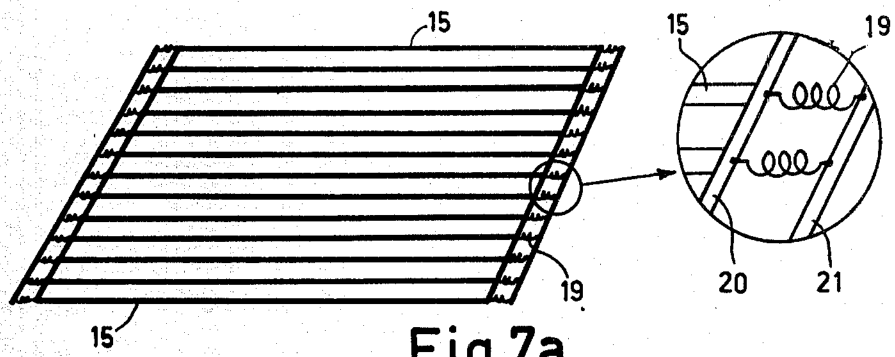
Figure 7B:
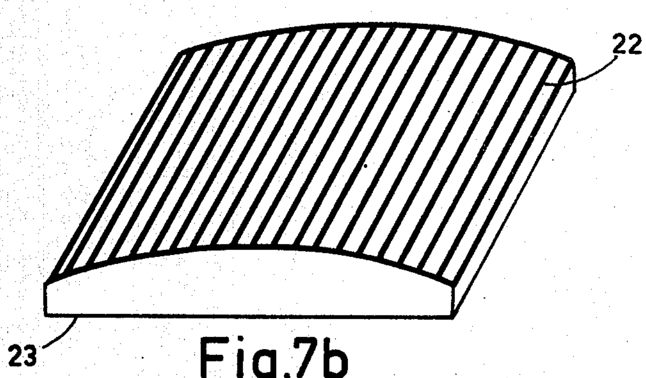
Figure 7C:
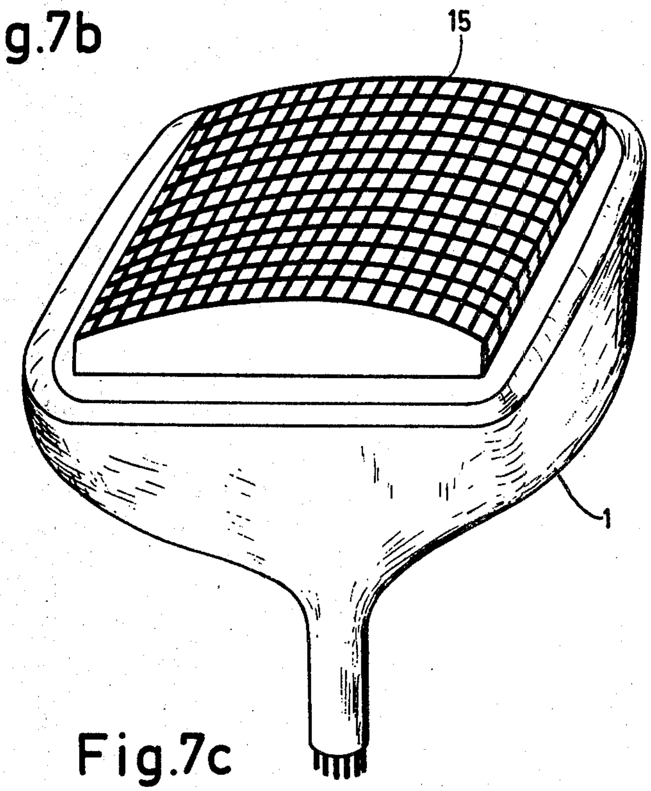

It is also possible to secure the supports 11, to the metal plate 17 by stretching them against it by means of at least one resilient element 19, as shown diagrammatically in FIS. 7*a*, *b* and *c*. The ends of the electrodes 15 are connected to strips 20. The strips 20 are in turn connected to strips 21 by means of a number of resilient elements 19 for example springs or pieces of elastic material. FIG. 7*b* shows a metal plate 22 of a shape as such that shown in FIG. 6 which is bent on a frame 23 which also serves for reinforcement. By also securing the strips 21 to the frame 23, the system of parallel electrodes 15 is stretched across the metal plate 22 as is shown in FIG. 7*c*. The frame 23 is suspended in the envelope in the usual manner. This method of securing proves to be possible even with a large number of glass supports 11 such as those illustrated in FIG. 3.

FIG. 8 diagrammatically shows an example of an apparatus for carrying out a method embodying the invention. The apparatus comprises a reel 24 carrying a roll 25 of polyimide foil which is covered with a metal film, a cutting device 26 to form the electrodes 27 and a reel 28 carrying a roll of plate material 29 of the configuration illustrated in FIG. 5*b*. The 100 μm thick polyimide foil is provided on one side with an aluminium foil 1 μm thick and is cut into strips which form the electrodes 27. A pressure roller 30 presses the strips between the apertures 31 of the metal plate 29 which is covered with a polyamide solution. It is alternatively possible to provide the polyamide solution on the strips 27. In this manner, the strip 36 having lens electrodes is obtained of the configuration illustrated in FIG. 5*c*. The strip 36 is guided with the aid of guide rolls 32 through a high-frequency furnace 33 in which the polyamide is converted into polyimide. After leaving the furnace, a knife 34 cuts the strip 36 into plates 35. The plates, possibly after a drawing process in which they are drawn in a curved shape, constitute the color selection means 7. It is also possible first to cut the electrode assembly 36 into plates 35 and then treat them in a furnace. The parallel electrodes 27 in each plate 35 are connected together electrically by a connection strip (not shown). The connection of the supports between the apertures 31 in the plate material 29 is carried out by positioning the supports prior to securing by means of pin-shaped or slot-shaped guides. However, it is alternatively possible to provide the pressure roller 30 with a number of circumferential grooves which is equal to the number of supports; the depth of the grooves being slightly smaller than the thickness of the supports. By the combination of such a pressure roller with a heating device, for example a heating coil in the roller, and with a suitable material for the roller, the distance between two grooves and hence between two supports can be varied and be adapted, for example, to small variations in the pitch of the apertures in the plate material 29 by a variation in the temperature difference between the roller and the plate. As a result, the roller expands or shrinks. An aluminium pressure roller has been found to give very good results with steel plates.

It is alternatively possible to cover the supports 11 on the side facing the plate with a metal which produces a diffusion connection between the electrodes 27 and the plate material 29 by the pressure of the pressure roller 30 and/or the thermal treatment in the furnance 33.

A display screen for a tube embodying the invention can be manufactured with a known exposure method, in which the color selection means is reproduced on a photosensitive layer on a window portion of the tube. Small variations in the distance between the supports may cause errors in width of the phosphor strips (R, G and B, FIG. 5*d*). By using a device illustrated in FIG. 8, such variations and hence errors can be minimized since the distance between the supports can be set quite accurately.

Because of the improved transmissivity attainable by the color selection means, the exposure method used should be suitable to reproduce the apertures 9 in a strongly narrowed manner. An exposure method suitable for this purpose uses two or more light sources at some distance from each other, as described in German Patent Application No. 2,248,878. A tube embodying the invention can alternatively be made with the aid of so-called electronic exposure, in which the sensitive layer on the window portion is "exposed" by means of an electron beam.

What is claimed is:

1. An apparatus for fabricating a quadrupole shadow mask from a long metal strip having a mulitiplicity of spaced apertures arranged in a plurality of longitudinally extending substantially parallel spaced rows, said apparatus comprising:

means for storing such a long metal strip and feeding it along a path;

means for supplying a plurality of strips of insulating material of generally the same width as the spacing between said rows and having on at least one side thereof a conductive layer;

means for positioning respective insulating strips adjacent said spaces between said rows, with said at least one side being the side remote from said metal strip, and then applying said insulating strips to said metal strip as said metal strip is fed along said path; and means for cutting said metal strip with said insulating strips applied thereto into sheets of predetermined length, CHARACTERIZED IN THAT said positioning and applying means includes a roller for pressing said insulating strips into engagement with said metal strip, said roller being provided with a plurality of circumferential grooves for guiding said insulating strips into registry with said spaces of said metal strip between said rows.

2. The apparatus as claimed in claim 1, wherein said means for supplying includes means for storing a web of said insulating material with said conductive layer and means for cutting said web into said insulating strips.

3. The apparatus as claimed in claim 1, including means for heating said metal strip with said insulating strips applied thereon.

4. The apparatus as claimed in claim 1, 2 or 3, wherein said roller includes means for slightly varying the distance between each of said grooves.

5. The apparatus as claimed in claim 4, wherein said varying means comprises means for heating the roller.

6. The apparatus as claimed in claim 5, wherein said roller is formed of aluminum.

7. The apparatus as claimed in claim 5, wherein said roller heating means is a heating coil in said roller.

8. The apparatus as claimed in claim 3, wherein said strip heating means is a high-frequency furnace.

* * * * *

UNITED STATES PATENT AND TRADEMARK OFFICE
CERTIFICATE OF CORRECTION

PATENT NO. : 4,374,452

DATED : February 22, 1983

INVENTOR(S) : JACOB KOORNEEF

It is certified that error appears in the above—identified patent and that said Letters Patent is hereby corrected as shown below:

IN THE TITLE PAGE:

CHANGE TITLE TO READ --APPARATUS FOR MANUFACTURING A COLOR DISPLAY TUBE SHADOW MASK--

Signed and Sealed this

*Twenty-sixth* Day of *April 1983*

[SEAL]

*Attest:*

GERALD J. MOSSINGHOFF

*Attesting Officer* *Commissioner of Patents and Trademarks*